US005973262A

United States Patent [19]

Matubara

[11] Patent Number: 5,973,262

[45] Date of Patent: Oct. 26, 1999

[54] MULTI-TAP DISTRIBUTION APPARATUS

[75] Inventor: Hiroshi Matubara, Nisshin, Japan

[73] Assignee: Maspro Denkoh Co., Ltd., Aichi, Japan

[21] Appl. No.: 08/849,698

[22] PCT Filed: Jul. 24, 1996

[86] PCT No.: PCT/JP96/02111

§ 371 Date: Jun. 11, 1997

§ 102(e) Date: Jun. 11, 1997

[87] PCT Pub. No.: WO97/14197

PCT Pub. Date: Apr. 17, 1997

[30] Foreign Application Priority Data

Oct. 13, 1995 [JP] Japan .................................... 7-265902

[51] Int. Cl.[6] ........................................................ H02G 3/08

[52] U.S. Cl. ......................... 174/52.1; 361/622; 361/736; 439/76.1

[58] Field of Search .................................... 361/736, 728, 361/752, 814, 622; 439/76.1; 174/52.1

[56] References Cited

U.S. PATENT DOCUMENTS

| | | | |
|---|---|---|---|
| 3,617,811 | 11/1971 | McVoy | 317/99 |
| 4,755,776 | 7/1988 | Preschutti | 333/100 |
| 4,963,966 | 10/1990 | Harney et al. | 358/349 |
| 5,058,198 | 10/1991 | Rocci et al. | 455/3 |
| 5,334,050 | 8/1994 | Andrews | 439/579 |
| 5,613,859 | 3/1997 | Bellantoni et al. | 439/63 |

FOREIGN PATENT DOCUMENTS

| | | |
|---|---|---|
| 52-55962 | 1/1977 | Japan . |
| 62-196435 | 4/1987 | Japan . |
| 63-25801 | 2/1988 | Japan . |
| 63-20156 | 4/1988 | Japan . |
| 2119362 | 4/1990 | Japan . |
| 4217101 | 5/1992 | Japan . |
| 6283871 | 10/1994 | Japan . |
| 8181559 | 7/1996 | Japan . |

*Primary Examiner*—Kristine Kincaid
*Assistant Examiner*—William Silverio
*Attorney, Agent, or Firm*—Pearson & Pearson

[57] ABSTRACT

There is provided a distribution apparatus in which transmission losses at the connections between ends of transmission lines and input and output terminals of a mother board are reduced. These ends of the transmission lines are positioned on resin support pieces. A resin support piece (19) is provided at a dead end of each groove (6*a*) formed in a housing (1). An end portion of a metal rod (6*b*) is placed on the support piece (19). The end portion of the rod (6*b*) has a threaded hole (20) formed therethrough. The mother board (11) is provided with two first lands (22,23) each surrounding a screw hole (21). A screw (22*a*) is tightened in each threaded hole (20), which is part of a main line connection terminal (5*b*), thereby bringing the head of the screw (22*a*) into firm contact with the first land (22) and establishing an electrical connection between the first land (22) and the conductive rod (6*b*). Provided outside each of the first land (22) is a circular and concentric second land (23) with a portion cut out of it. The second land (23) is insulated from the first land (22) and electrically connected to the housing (1) via contact pieces (23*a*) projected from the rear surface of the mother board (11).

2 Claims, 9 Drawing Sheets

MULTI-TAP DISTRIBUTION APPARATUS

FIELD OF THE ART

The present invention relates to a multi-tap distribution apparatus. More particularly, the present invention relates to a multi-tap distribution apparatus which is suitable for use with CATV cables.

BACKGROUND ART

Distribution apparatus for being interposed in CATV transmission cables come in different types due to the needs to provide input and output cable connecting portions in different positions and also to provide various numbers of taps. To meet these needs, multi-tap distribution apparatuses for general purpose use have been proposed whose internal mechanisms are composed of a plurality of modules. In one type of such general-purpose distribution apparatuses, a mother board with a current transmission circuit and a branch circuit board are designed in modules that can be assembled in different ways to suit particular applications.

CATV transmission cables carry not only television signals, control signals, and other high-frequency signals but also currents for operating main line amplifiers. For this reason, the above-mentioned type of distribution apparatuses are designed to transmit currents therethrough. Currents should not be carried through the branch circuit or the distribution circuit of this type of apparatuses. To avoid this, these distributors have a dedicated circuit provided in a mother board especially for current transmission and connect the input and output cable connecting portions via the dedicated circuit. Generally, these apparatuses employ an insertion type connecting structure to connect the mother board with the transmission cables, which are directly coupled to the input and output cable connecting portions.

Although only currents of low amperage are passed to each tap in this type of apparatuses, the cable connecting portions carry the same maximum currents as the main line does. Therefore, the transmission losses between the input and output cable connecting portions must be reduced and any adverse effect on the characteristics of the electromagnetic waves must be also minimized.

However, the aforementioned insertion type connecting structure causes not only transmission losses easily but also over-heating if a current of high amperage is carried therethrough, so that the heat may affect the characteristics of the circuits mounted on the mother board.

SUMMARY OF THE INVENTION

It is therefore an object of the invention to provide a distribution apparatus in which transmission losses at the connections between ends of transmission lines and input and output terminals of a mother board are reduced.

It is another object of this invention to provide transmission lines for electrically connecting the input and output terminals of a mother board to cable connecting portions provided on sides of a case comprising the mother board.

It is a further object of this invention to provide lands around through-holes in the mother board into which electrically conductive screws are inserted to establish electrical connections between the transmission lines and the input and output terminals of the mother board.

These and other objects are further accomplished by a distribution apparatus for being interposed in a transmission cable, the distribution apparatus comprising, a built-in mother board disposed in the approximate center of a case, the mother board including, a branch circuit for distributing as output signals high-frequency signals received at an input terminal of the mother board, and a current transmission circuit for allowing currents to be transmitted between the input terminal and an output terminal of the mother board, transmission lines for electrically connecting the input and output terminals of the mother board to cable connecting portions provided on sides of the case, the transmission lines each having a center conductor with a threaded hole formed in one end thereof, each of the central conductors of each of the transmission lines is disposed in a groove formed in an inner wall of the case without being in contact with the inner wall, and a structure for connecting each of the central conductors to the mother board is assembled at a dead end of the groove, and lands provided around through-holes which are formed in the mother board and through which electrically conductive screws are inserted, wherein the screws are tightened into the threaded holes through the through-holes so that electrical connections are established between the transmission lines and the input and output terminals of the mother board via the screws. At least three cable connecting portions are provided so that two cable connecting portions are selectable from the at least three cable connecting portions for connection to the mother board.

BEST MODE FOR CARRYING OUT THE INVENTION

A multi-tap distribution apparatus embodying the present invention will be explained with reference to the attached drawings. The multi-tap distribution apparatus of the embodiment is provided with three cable connecting portions so as to be used as either an aerial type or pedestal type device. Also, the number of taps can be changed in the distribution apparatus of this embodiment.

Figure 1:
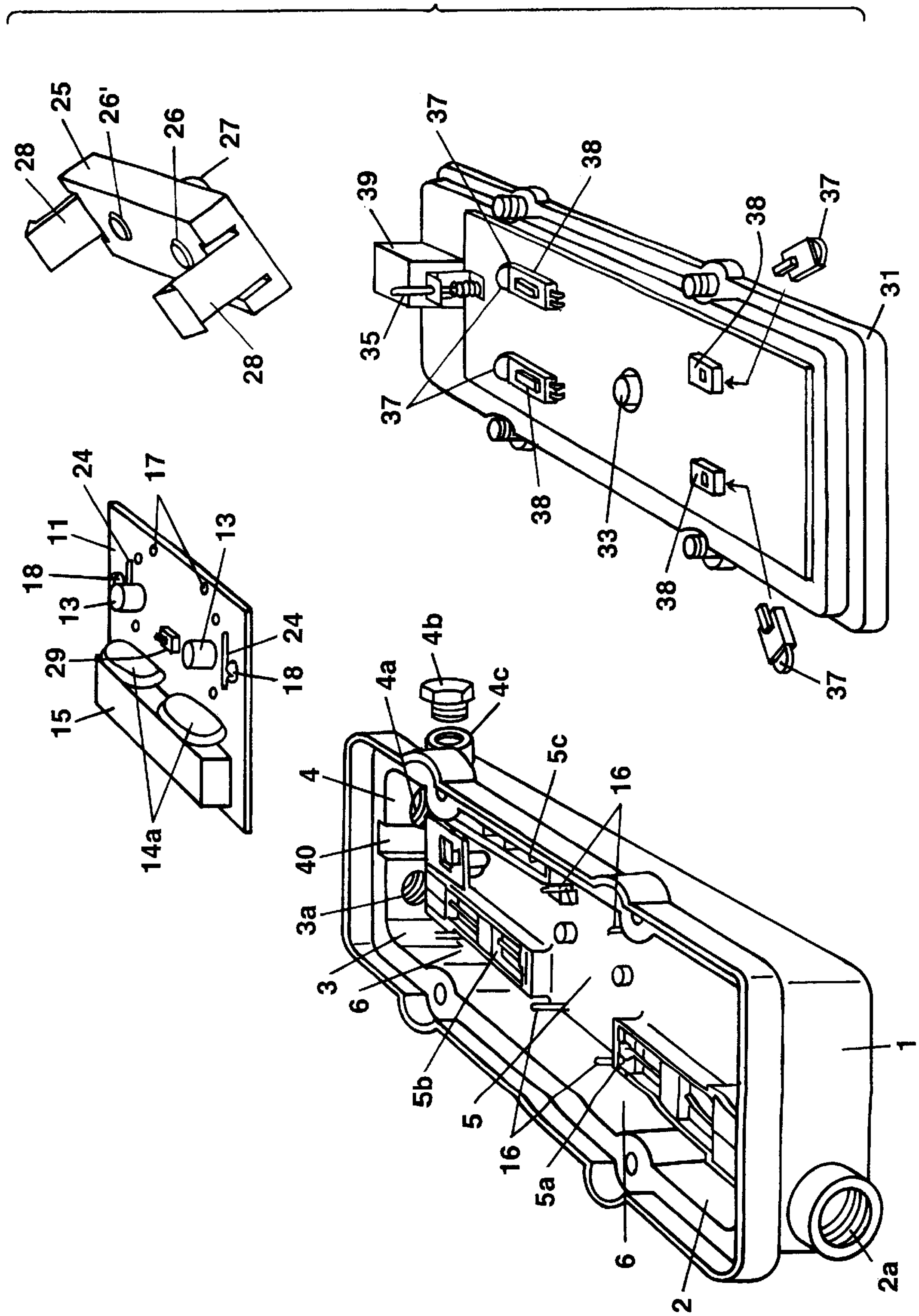
FIG. 1 is an exploded perspective view of a multi-tap distribution apparatus of an embodiment of the present invention.
Figure 2:
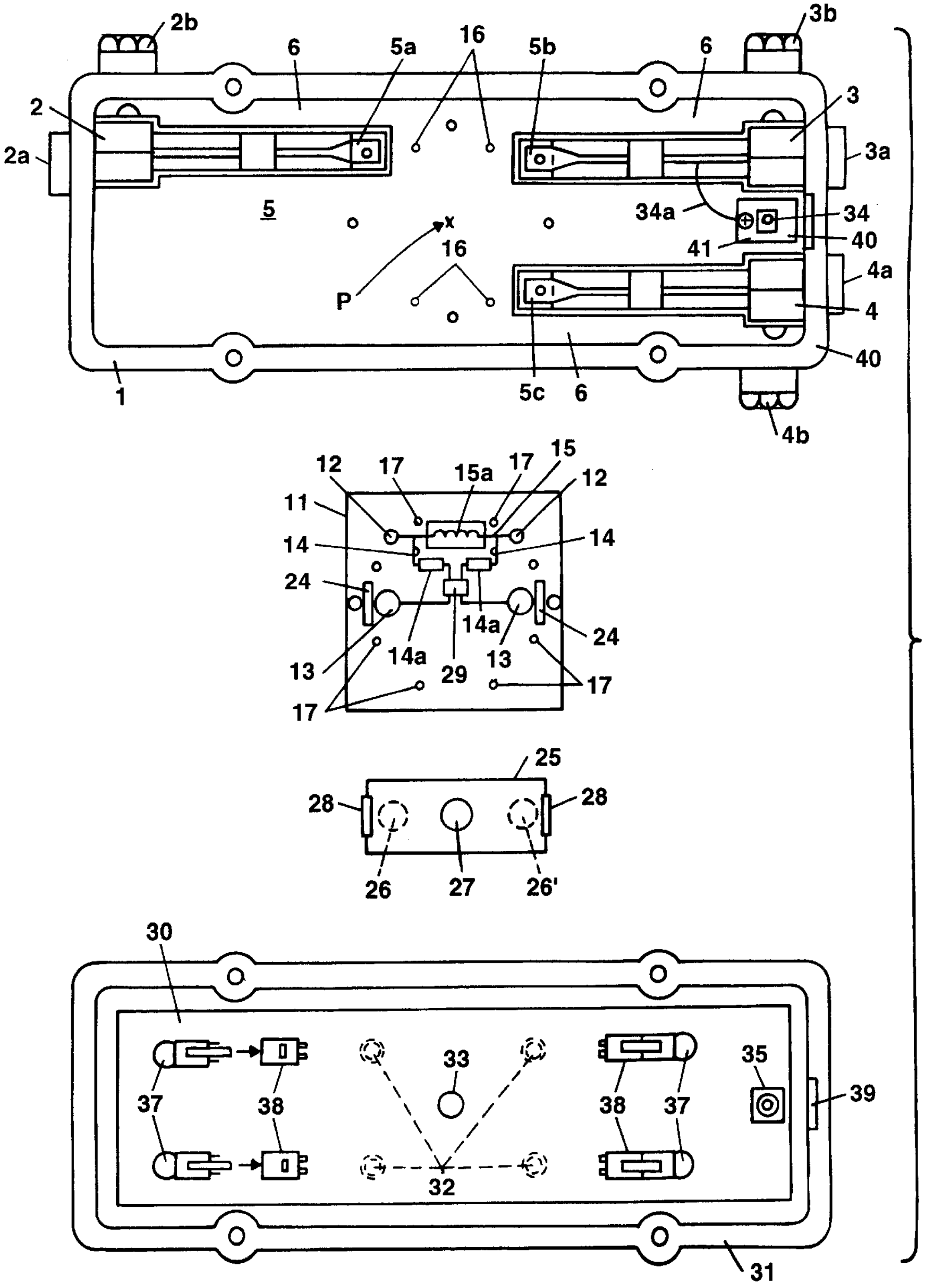
FIG. 2 shows a plan view of the components of the multi-tap distribution apparatus.
Figure 3:
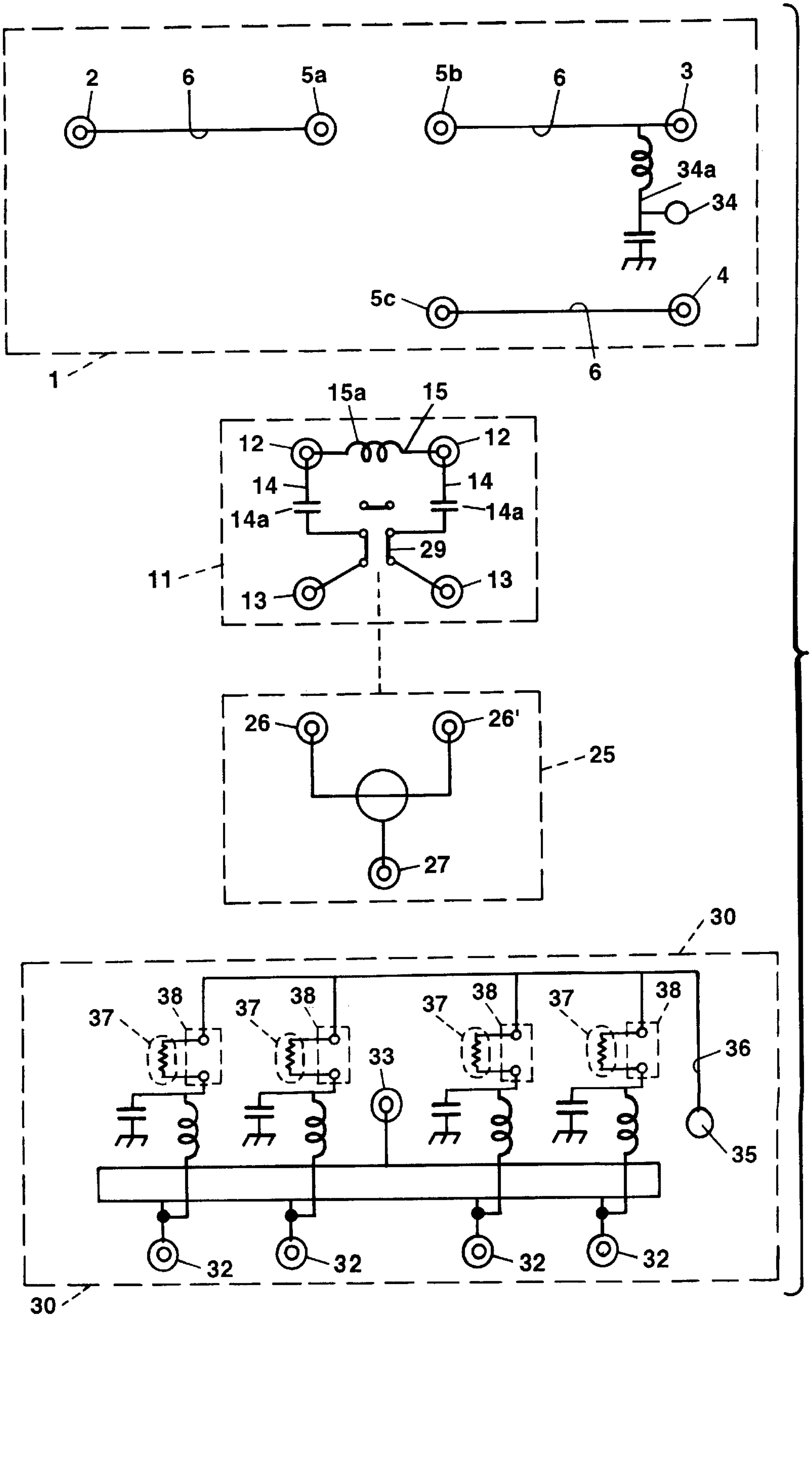
FIG. 3 shows a circuit diagram of the components of the multi-tap distribution apparatus.

Referring to FIGS. 1 to 3, reference numeral 1 designates a box-shaped housing made of die-cast aluminum with one side open. The housing 1 (one of the two components forming the entire case) is provided with one cable connecting portion 2 on one end surface and two other cable connecting portions 3 and 4 on the opposite end surface. Each of the cable connecting portions 2, 3, and 4 is disposed on a corner of the housing 1. Cable connector insertion holes 2*a*, 3*a*, and 4*a* are provided in the end surfaces while three screw access holes 2*c*, 3*c*, and 4*c* are provided in the longitudinal sides of the housing 1. The screw access holes 2*c*, 3*c*, and 4*c* are normally closed with blind bolts 2*b*, 3*b*, and 4*b*.

The housing 1 has in its center a circuit mounting area 5 on which three main line connection terminals 5*a*, 5*b*, and 5*c* are provided. The upper terminals 5*a* and 5*b* are located above, and on the right and left sides of, the center P of the housing 1 while the terminal 5*c* is located directly under the right terminal 5*b*. The terminals 5*a*, 5*b*, and 5*c* are connected to the cable connecting portions 2, 3, and 4, respectively, via transmission lines 6.

Figure 4A:
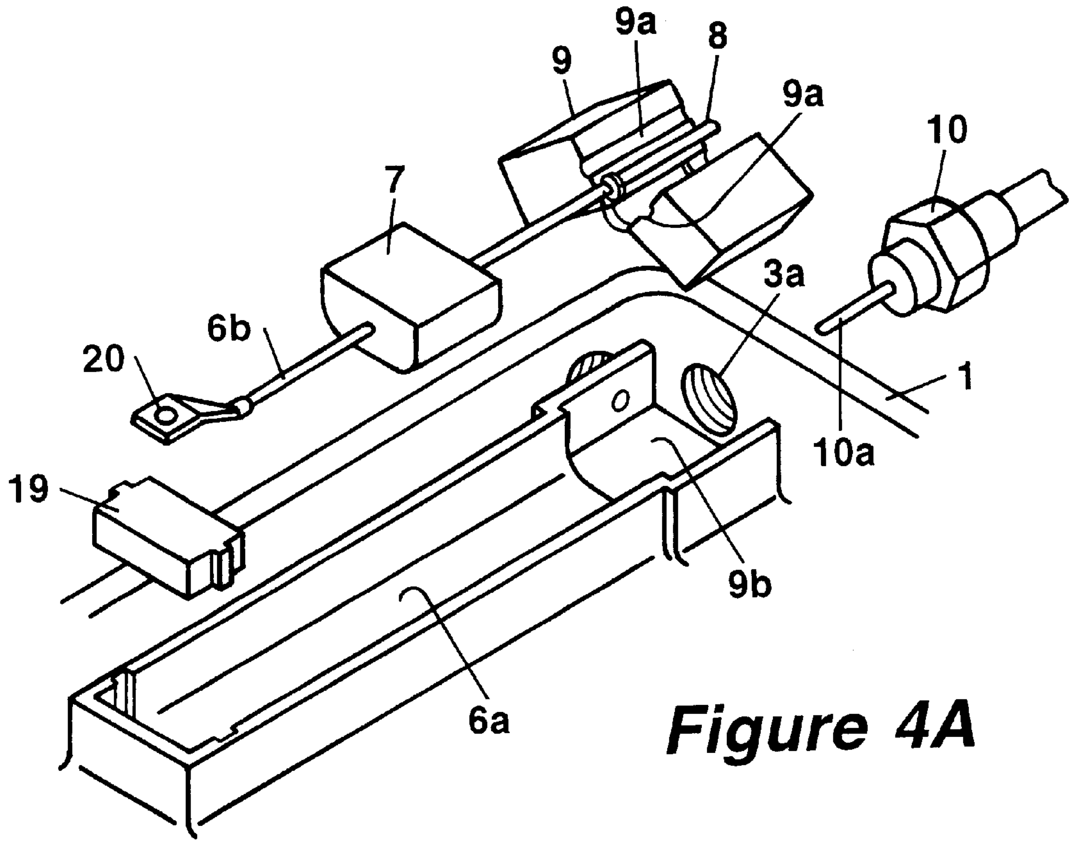
FIGS. 4A and 4B show the transmission line of the embodiment.
Figure 4B:
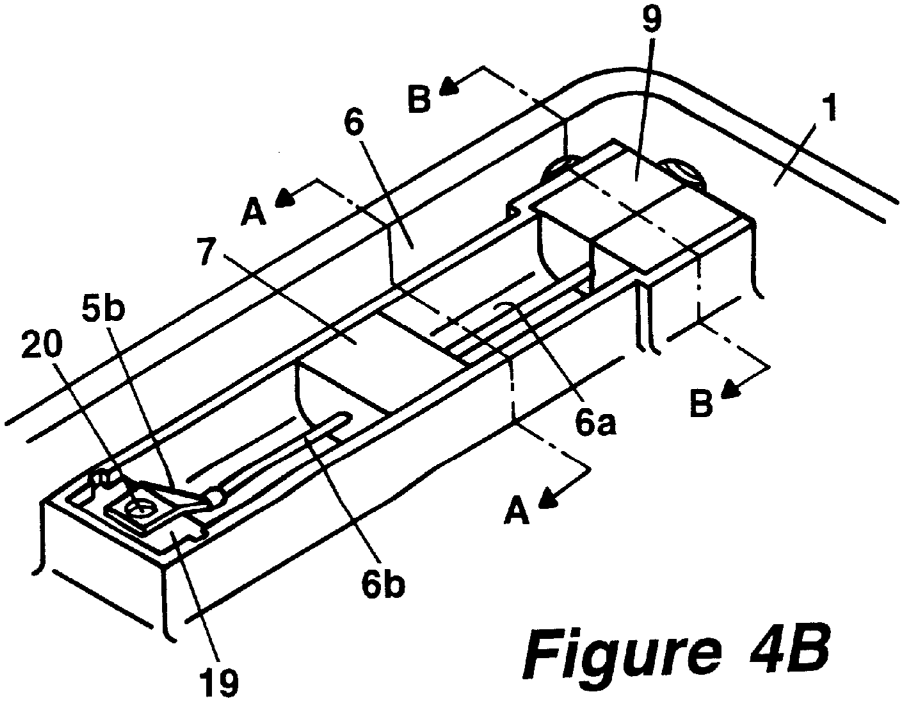

Referring to FIGS. 4A and 4B, each transmission line 6 has a coaxial structure formed on the inner wall of the housing 1. The transmission line 6 includes a brass or copper conductive rod 6*b* disposed as the central conductor in a groove 6*a* without being in contact with the inner wall of the groove 6*a*. The groove 6*a* has a semi-circular cross section and a shield wall erected on each side.

The transmission line 6 further includes a dielectric block 7 which is penetrated by the conductive rod 6*b* and mounted in the groove 6*a*. The dielectric block 7 has an outer shape that fits in the groove 6*a* and occupies part of the groove 6*a* so as to be slidable in the longitudinal direction of the groove 6*a*.

Figure 5:
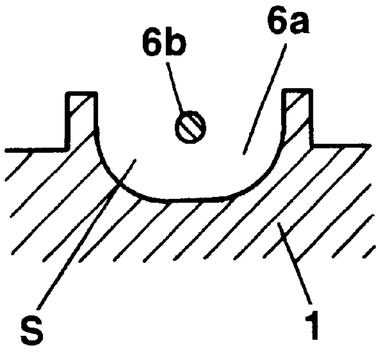
FIG. 5 is a cross sectional view of the transmission line taken on line A—A of FIGS. 4B.

Being formed on the inner wall of the case in this manner, the transmission line 6 offers the following advantages. The thickness of the conductive rod 6*b* can be freely changed. Moreover, referring to FIG. 5 showing a cross section taken on line A—A, each transmission line has a layer S of air between the conductive rod 6*b* and the inner wall of the groove 6*a*, which serves as the outer conductor. This structure causes only a small transmission loss so that the transmission line is capable of coping with currents of high amperes. Furthermore, the structure allows adjustment of the high-frequency characteristics of the transmission line by moving the dielectric block 7 along the groove.

Figure 6:
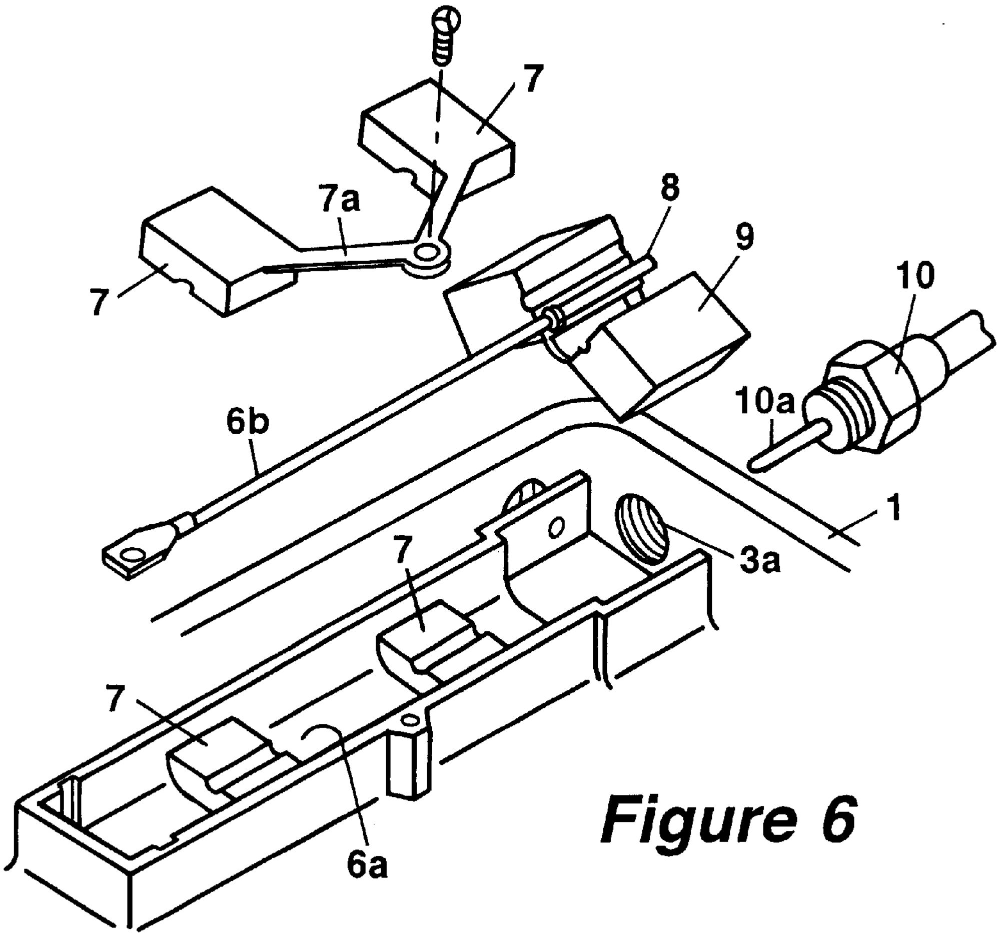
FIG. 6 shows an alternate transmission line of the embodiment.

The preferred material of the dielectric block 7 is Jurakon (a brand name; manufactured by Polyplastics Corporation). Alternatively, the block may be made of some other synthetic resin with similar electrical characteristics. Depending on the application, the dielectric block 7 may be fixed in the groove 6*a* so as not to be slidable. Furthermore, as shown in FIG. 6, a plurality (for example, two as shown) of the dielectric blocks may be fixed in each groove 6*a*. As illustrated, each of the blocks 7 may be divided into two sections with the two upper sections connected by an arm 7*a*, so that the upper sections can be easily mounted in the groove by securing the arm 7*a* to the housing 1 with a screw.

Also, a split tube 8 with a slit is secured to one end of the conductive rod 6*b*. The split tube 8 is gripped and supported by a pair of grip blocks 9 in the cable connecting portion 2 (3, 4). The grip blocks 9 are connected by a hinge. A tube support groove 9*a* is formed in the split surface of each block. Furthermore, a block securing recess 9*b* which is formed integrally with the groove 6*a* is provided in the cable connecting position on the inner surface of the housing 1.

Figure 7:
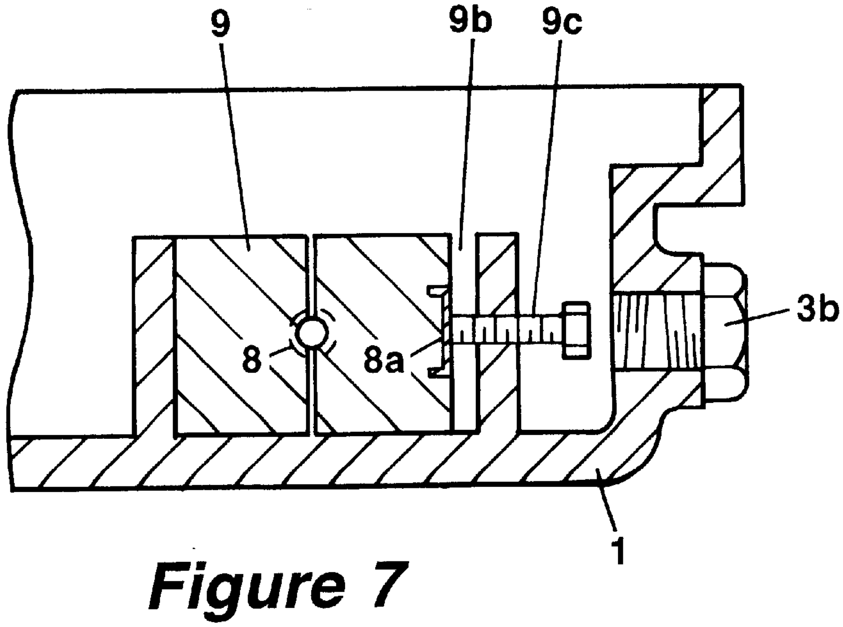
FIG. 7 is a cross sectional view of the transmission line taken on line B—B of FIGS. 4B.

For assembly, as shown in FIG. 7 which illustrates a cross section taken on line B—B, the split tube 8 is gripped in the support grooves 9*a* by fitting the two grip blocks 9 together. Then, the blocks 9 are positioned in the block securing recess 9*b* and secured by tightening a screw 9*c* at a side.

Then, a connector 10 attached to one end of a transmission cable is fitted into the cable insertion hole 2*a* (3*a*, 4*a*) by inserting a pin 10*a* of the connector 10 into the split tube 8. Finally, the screw 9*c* is tightened to firmly and securely connect the pin 10*a* to the split tube 8 between the grip blocks 9.

A metal abutment plate 8*a* is mounted on one of the grip blocks 9 where the screw abuts against the block to prevent cracking or deformation of the grip block. In addition, the abutment plate 8*a* allows the pressure of the screw 9*c* to be distributed over the entire length of the grip block 9. Also, the screw 9*c* can be tightened from the outside through the screw access hole upon removing the blind bolt 3*b* (2*b*, 4*b*).

Reference numeral 11 is a mother board having a pair of transmission terminals 12 on its rear face and a pair of relay terminals 13 on its front face. The transmission terminals 12 are spaced apart so as to correspond with the main line connection terminals 5*a* and 5*b* (or 5*b* and 5*c*). Each of the transmission terminals 12 is connected to a relay terminal 13 via a high-frequency passing circuit 14 with a capacitor 14*a* interposed therein. The circuits 14 allow high-frequency signals to pass therethrough. The two transmission terminals 12 are connected to each other by a current transmission circuit 15 with a coil 15*a* interposed therein. The current transmission circuit 15 is also protected with a cover.

Also, the housing 1 has a plurality of guide pins 16 projected therefrom while the mother board 11 has a plurality of guide holes 17 formed therein corresponding to the guide pins 16. The mother board 11 is mounted in the housing 1 by inserting the guide pins 16 into the guide holes 17. In this way, the transmission terminals 12 are easily aligned and brought into contact with, for example, the main line connection terminals 5*a* and 5*b*, although these terminals are not visible behind the mother board 11 during mounting. Then, the mother board 11 is secured to the housing 1 with a pair of screws 18.

Also, the mother board 11 has a pair of screws tightened through the transmission terminals 12 to firmly secure the terminals 12 to the main line connection terminals 5*b* (5*a*, 5*c*).

Figure 8:
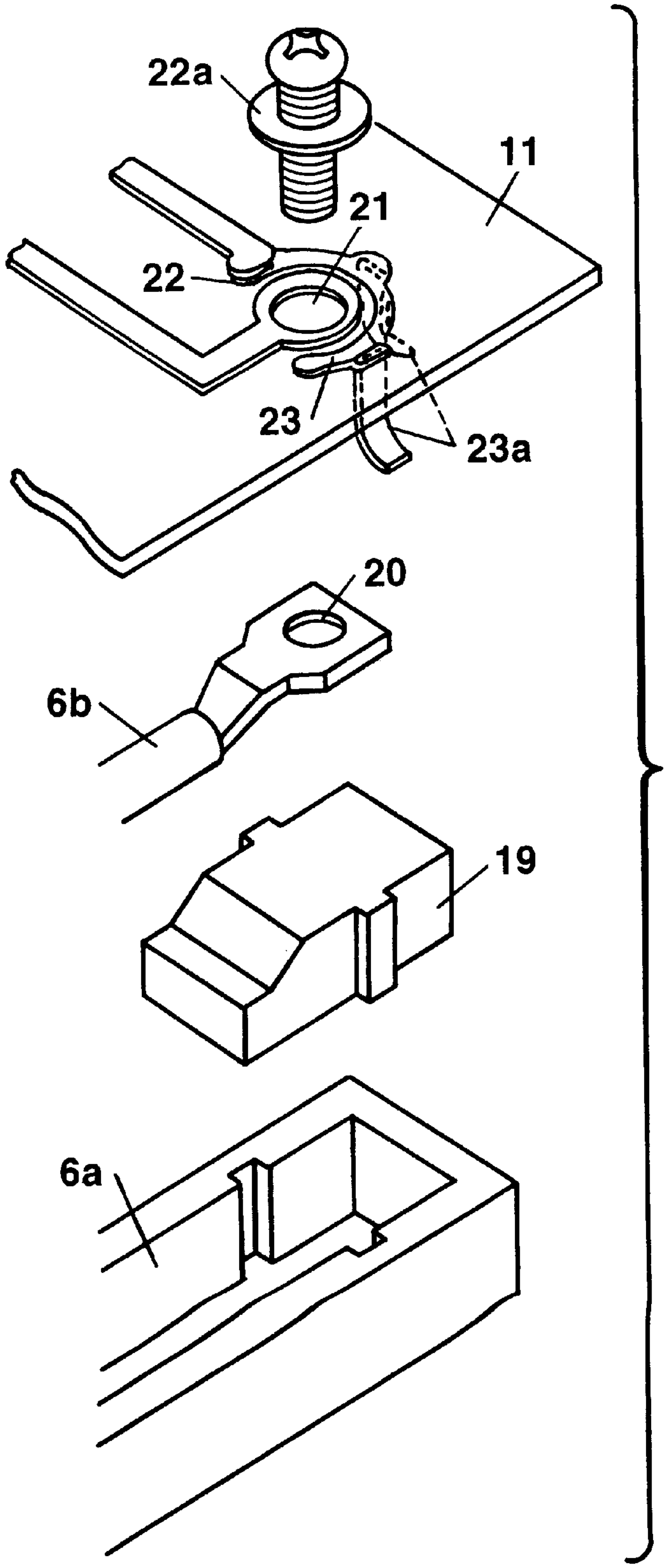
FIG. 8 shows the main line connection terminal of the embodiment.

Referring to FIGS. 4A and 4B, each of the main line connection terminals 5*a*, 5*b*, and 5*c* includes a resin support piece 19 provided at a dead end of the groove 6*a* and an end portion of the conductive rod 6*b* placed on the support piece 19. The end portion of the rod 6*b* has a threaded hole 20 formed therethrough. As shown in FIG. 8, the transmission terminal 12 is provided with a first land 22 surrounding a screw hole 21 in the mother board 11. The conductive screw 22*a*, made of brass or iron for example, is tightened in the threaded hole 20 of the main line connection terminal 5*b*, thereby bringing the head of the screw 22 into firm contact with the first land 22*a* and establishing an electrical connection between the first land 22 and the conductive rod 6*b*.

If the conductive rod 6*b* is securely supported by two dielectric blocks 7 as shown in FIG. 6, the support piece 19 is optional and can be omitted from the main line connection terminal 5*b* (5*a*, 5*c*).

Figure 9:
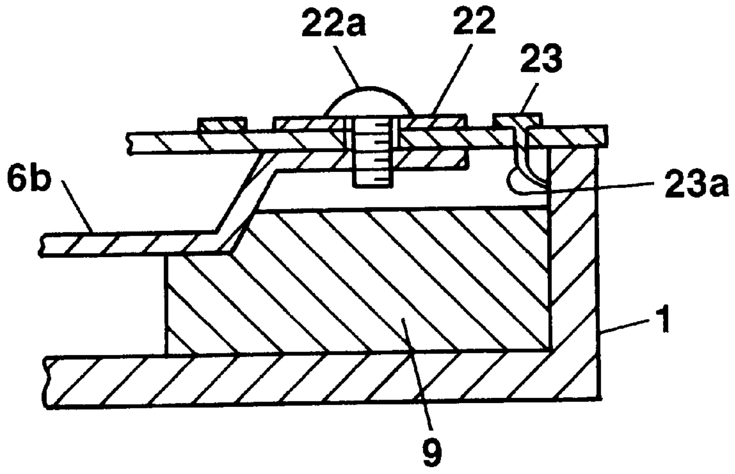
FIG. 9 is a cross sectional view illustrating how the main line connection terminal is connected to the mother board.

Provided outside the first land 22 is a circular and concentric second land 23 with a portion cut out of it. The second land 23 is insulated from the first land 22 and electrically connected to the housing 1 via contact pieces 23*a* projected from the rear surface of the mother board 11. Thus, the main line connection terminal 5*b* (5*a*, 5*c*) is coaxially connected to the transmission terminal 12 (see FIG. 9).

Also, the mother board 11 has a pair of engaging slits 14 formed therein outside the relay terminals 13.

Reference numeral 25 designates a box-shaped branch unit which has on one surface a pair of connection terminals 26 and 26' which correspond to the relay terminals 13 of the mother board 11. The branch unit 25 has on the opposite surface a branch terminal 27. The connection terminals 26 and 26' and the branch terminal 27 are connected to a built-in branch circuit. With the connection terminal 26 serving as the input terminal and the connection terminal 26' serving as the output terminal, the branch unit 25 can convey high-frequency signals in a predetermined direction. It also has on both ends thereof two engaging claws 28 projected toward the surface where the connection terminals 26 and 26' are located. When the branch unit 25 is mounted on the mother board 11 by engaging the claws 28 with the slits 24, the connection terminals 26 and 26' are brought into contact with the relay terminals 13.

The branch unit 25 on the mother board 11 may be mounted by some other method. For example, the engaging claws formed on the branch unit may be replaced with guide lugs which are inserted into the slits formed in the mother board. Furthermore, screws or clips may be employed as the means of mounting the branch unit on the mother board.

The mother board 11 is provided with a push switch 29. When the branch unit 25 is mounted on the mother board 11, the outer surface of the branch unit 25 presses against and turns off the switch 29. When the branch unit 25 is detached from the board mother 6, the push switch 29 is released from the pressure of the unit 25 and turned on, thus short-circuiting the relay terminals 13 and allowing passage of high-frequency signals between the transmission terminals 12.

Moreover, the current transmission circuit 15 of the mother board 11 ensures that currents and high-frequency signals flow between the transmission terminals 12 whether or not the branch unit 25 is mounted on the mother board 11.

Reference numeral 30 is a tap board mounted on the inner surface of a main body 31. Together with the housing 1, the main body 31 constitutes the entire case of the distribution apparatus. The tap board 30 includes a distributing circuit and four external taps 32 exposed on the outer surface of the main body 31. The external taps 32 serve as distribution output terminals. The tap board 30 also has on its inner surface an input terminal 33 corresponding to the branch terminal 27 of the branch unit 25. Additionally, the housing 1 is provided with a current passage contact 34 which is connected to the cable connecting portion 2 while the main body 31 is provided with another current passage contact 35 which is connected to the distributing circuit. Therefore, currents can be transmitted through these two contacts. The current passage contact 34 is connected to the external taps 32 via a current passage network 36 provided in the tap board 30. By fitting the main body 31 on the housing 1, the branch terminal 27 is brought into contact with the input terminal 33. At the same time, an electrical contact is also established between the current passage contacts 34 and 35, thereby forming a separate current passing route from the high-frequency passing route.

Figure 10:
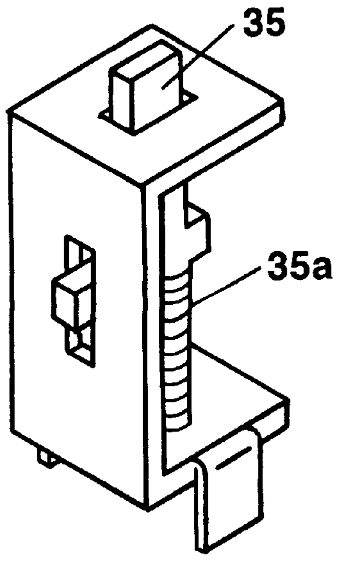
FIG. 10 shows the current passage contact of the embodiment.
Figure 11A:
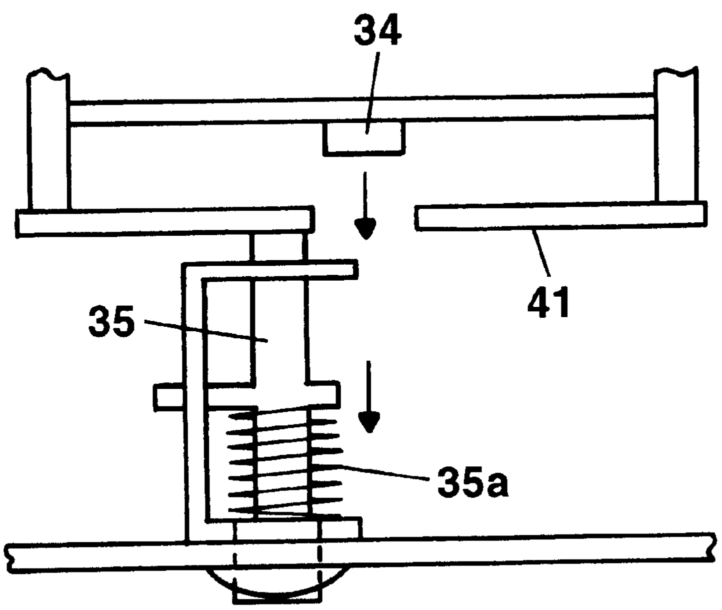
FIGS. 11A and 11B shows the current passage contact in two states.
Figure 11B:
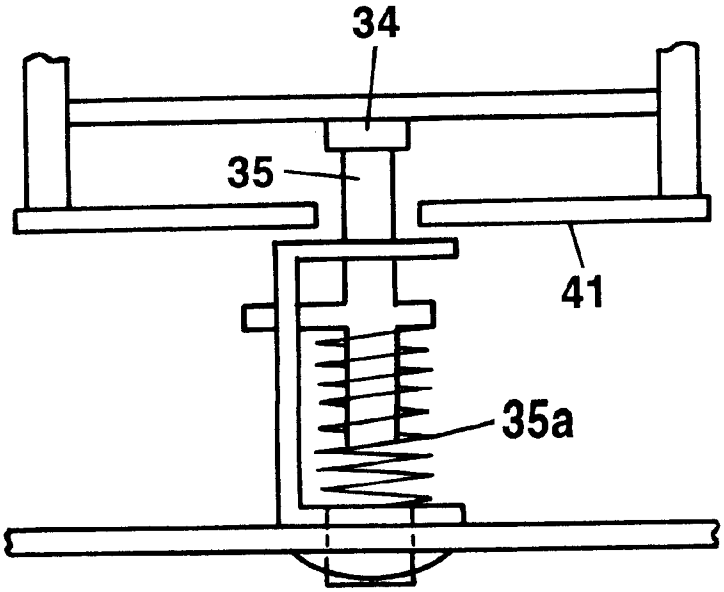

As shown in FIG. 10, the current passage contact 35 is of a pin type biased toward the tip thereof by a coil spring **35*a*. The current passage contact 35 is welded at its bottom end to the print-circuit board or the tap board 30 so as to be erected on the tap board. The contact, if shifted off the insertion-type current passage contact 34, compresses the coil spring 35*a* and moves backward, with its tip abutting on a protective plate 41 (explained in further detail below) (see FIG. 11A). However, when the housing 1 is moved with respect to the main body 31, the current passage contact 35 also moves smoothly on the protective plate 41. When the two contacts are aligned with each other, the contact 35 are projected forward by the biasing force of the coil spring 35*a* to reestablish an electrical contact (see FIG. 11**B).

A positive thermistor 37 (model name: Polyswitch RXE065; manufactured by Reikem Corporation) is interposed between the contact 35 and each distribution output terminal via a connector 38 in the current passage network 36. The positive thermistors 37 can be easily coupled to and detached with a single motion from the connectors 38 (model name: VH series connector; manufactured by Nippon Solderless Terminal Corporation).

The right and the left fitting ends of the housing 1 and the main body 31 have different shapes so that the housing and the body can be assembled in only one way. Assembly is possible only when a lug 39 projected from the housing 1 is inserted into a groove 40 formed in the main body 31. In this way, whenever the housing and the body are assembled, left-to-right inverted assembly is prevented while a secure electrical contact is established between the current passage contacts 34 and 35.

The current passage contact 34 is connected to the split tube of the cable connecting portion 3 via a current passage cable **34*a*. Normally, the upper surface of the current passage contact 34 is covered with the protective plate 41 which has a terminal insertion hole 41*a* to prevent the worker from accidentally touching the contact 34** and receiving an electric shock while at work.

The aforementioned protective plate 41 is made of a highly insulating, slippery resin such as ABZ resin so that the tip of the current passage contact 35 can be smoothly shifted on the plate 41.

Figure 12A:
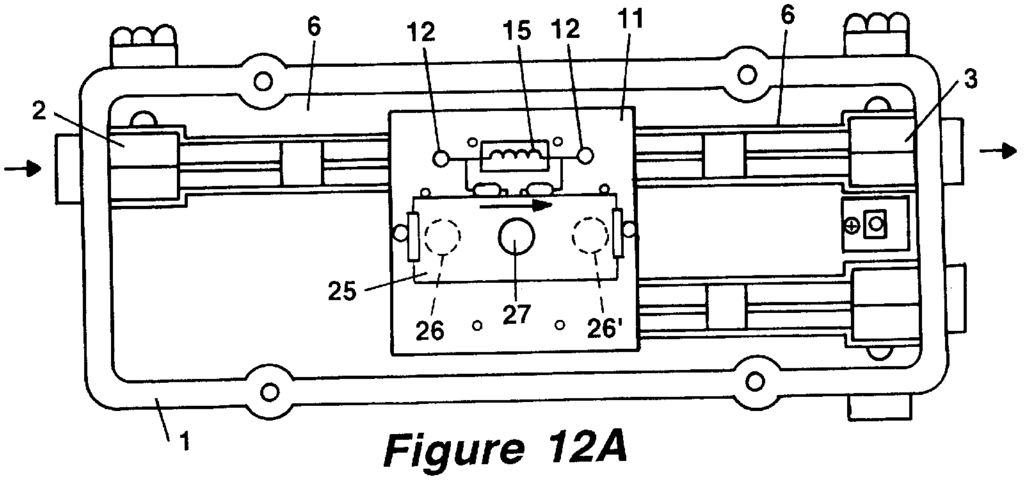
FIGS. 12A, 12B, and 12C show different pairs of cable connecting portions for use as terminals.

As shown in FIG. 12A, the multi-tap distribution apparatus can be used as an aerial type device if the branch unit 25 is mounted on the mother board 11 with the terminal 26 on the same side as the cable connecting portion 2 and the terminal 26' on the same side as the cable connecting portion 3. In this case, the cable connecting portion 2 is used as the input terminal while the cable connecting portion 3 is used as the output terminal.

Figure 12B:
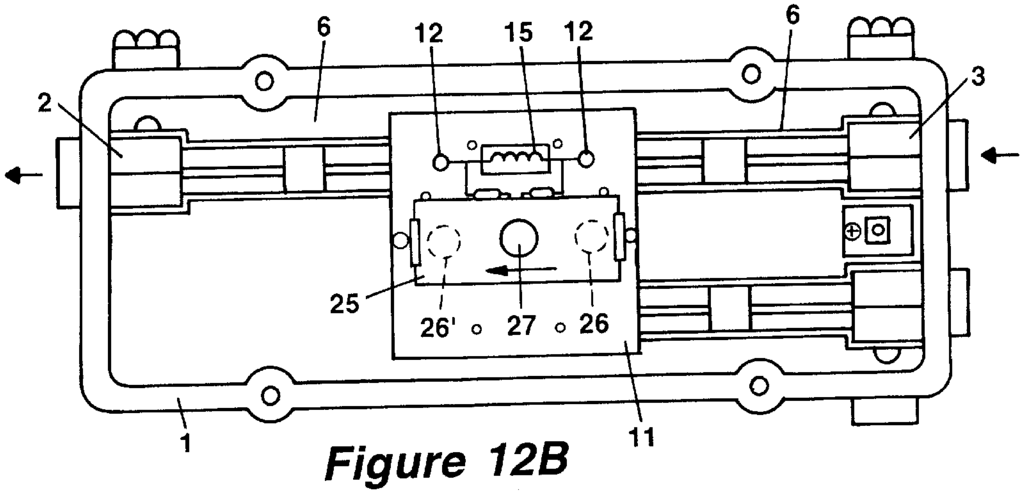

The positions of the input and output terminals can be easily reversed by detaching and horizontally rotating the branch unit 25 one hundred and eighty (180) degrees and mounting it back on the mother board 11 (see FIG. 12B).

Figure 12C:
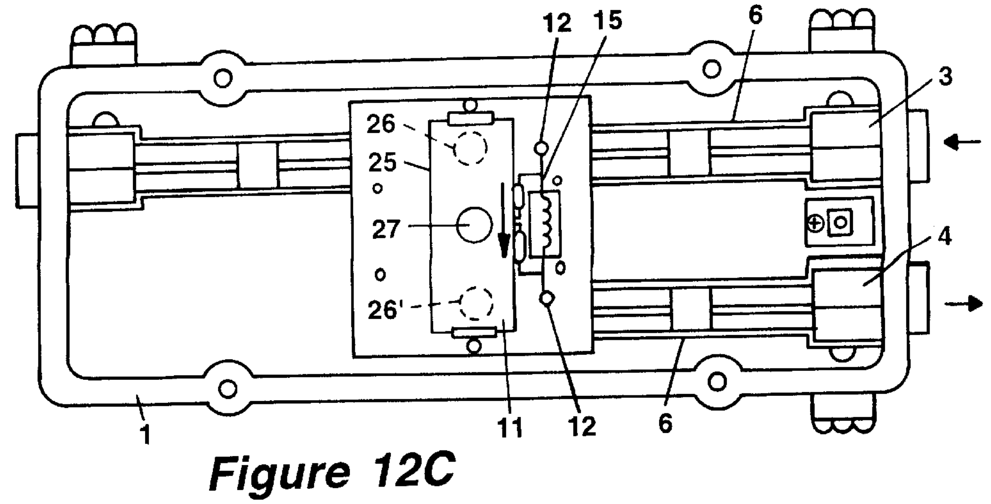

To use the multi-tap distribution apparatus as a pedestal type device, the mother board 11 is detached and rotated 90 degrees in clockwise direction as shown in FIG. 12C, so that the connection terminals 26 and 26' are connected with the main line connection terminals **5*b* and 5*c* via the transmission terminals 12. In this application, the cable connecting portion 3 serves as the input terminal and the cable connecting portion 4 as the output terminal. The positions of the input and output terminals can be easily reversed as in the aerial type application: by detaching and rotating the branch unit 25 one hundred and eighty degrees and mounting it back on the mother board 11** (this position is not shown).

To change the number of branches (secondary cables), the main body 31, the tap board 30, and the branch unit 25 are replaced with a different main body incorporating a tap board having a desired number of taps and a different branch unit.

To perform such a replacement, the branch unit 25 can be easily detached by disengaging the claws 28 from the slits 24. Upon detachment of the branch unit 25, the switch 29 is turned on, thus short-circuiting the transmission terminals 12 and maintaining high-frequency signal transmission between the cable connecting portions. Accordingly, the high-frequency signal transmission remains uninterrupted while the branch unit 25 is replaced.

In this embodiment, different cable connecting portions can be selected for use as the input and output terminals by rotating the mother board 90 degrees. Also, the number of taps can be increased or decreased by replacing the branch unit and the main body. Not only does this construction improve the operability of the multi-tap distribution apparatus, but it also allows the multi-tap distribution apparatus to be used as an aerial or pedestal type. Moreover, the multi-tap distribution apparatus offers the advantage of maintaining the check function from a remote site even when the branch unit or the main body is removed since the transmission of the currents and the high-frequency signals from the input side to the output side remains uninterrupted.

If the transmission cable is used as a telephone line, telephone conversations are not interrupted by using the current transmission circuit and the telephone line as the telephone uses signals in the low-frequency range.

If a short circuit occurs on the distribution output terminal side, the resistance of the positive thermistor included in the current passage network increases from tenths of an ohm to several kilo ohms, thus blocking the current flow between the cable connecting portion and the distribution output terminal. This protects the circuits in the distribution apparatus while preventing damage to equipment and devices connected to the transmission cable. This structure can be safely used in applications where currents of 15 amperes or more are conveyed.

As explained above, the high-frequency transmission circuit (branch circuit) is installed separately from the current passage network and a positive thermistor is connected to each distribution output terminal. Therefore, if a short circuit occurs, the current flow is interrupted only to the concerned branch output terminal while maintaining transmission of the television signals.

Since a positive thermistor is detachably connected to each external tap, it is possible to leave installed the positive thermistors for the external taps connected to the subscribers using telephone lines for receiving CATV services. Meanwhile, the power supply can be easily stopped to non-subscribers by removing from the connectors the positive thermistors for the external taps which are connected to non-subscribers. Not only can this operation be simply done but also it is easy to recognize to which externals taps currents are carried.

Alternatively, the same result can be obtained by providing switches (not shown) in the current passage network and selectively turning on and off the switches instead of detaching positive thermistors as explained above.

Furthermore, the multi-tap distribution apparatus may have only two cable connecting portions instead of three as in this embodiment. Furthermore, the number of taps may be either increased or decreased, the main body may have any number of taps.

As described above, the embodiment includes three main line connection terminals on the inner surface of the housing. Two of the terminals are located above and on both sides of the center of the housing while the third terminal is located directly under one of the upper terminals. Accordingly, the pair of main line connection terminals of the mother board to be connected with the transmission terminals can be selected by rotating the mother board. Instead of this construction, equally spaced pairs of main line connection terminals may be arranged on the housing so that the transmission terminals are connected to any desired pair of main line connection terminals by shifting the mother board. However, the present invention is applicable to the types of models in which main line connection terminals cannot be selected for connection or the number of external taps cannot be changed.

To change the mounting position of the mother board, all that is required is to remove screws and tighten them after the mother board is shifted to a new position. Since the screws, when tightened, firmly connects the end portions of the metal rods or central conductors of the transmission lines to the transmission terminals of the mother board, which serves as the input and output terminals of the mother board. The possibility of over-heating is effectively prevented by this structure.

Effect of the Invention

According to the invention, the input and output terminals of the mother board are securely connected to ends of the transmission lines with screws, with each of the line ends positioned on a support piece. This connecting structure provides a sufficient capacity to carry large currents between the cable connecting portions, thereby reducing the transmission losses between the cable connecting portions coupled to each other via the current transmission circuit as well as preventing over-heating and thus the adverse effect on the characteristics of the circuit of the mother board.

Furthermore, as a pair of cable connecting portions are selectable from a plurality of portions, a single distribution apparatus can be used as either an aerial or pedestal type apparatus.

Also, as each transmission line is disposed in a groove without being in contact with the inner wall of the groove, the transmission losses can be further reduced to a very minimum.

I claim:

1. A distribution apparatus for being interposed in a transmission cable, said distribution apparatus comprising, a built-in mother board disposed in the approximate center of a case, said mother board including, a branch circuit for distributing as output signals high-frequency signals received at an input terminal of said mother board, and a current transmission circuit for allowing currents to be transmitted between said input terminal and an output terminal of said mother board, transmission lines for electrically connecting said input and output terminals of said mother board to cable connecting portions provided on sides of said case, said transmission lines each having a center conductor with a threaded hole formed in one end thereof, each of the central conductors of each of said transmission lines is disposed in a groove formed in an inner wall of said case without being in contact with said inner wall, and a structure for connecting each of said central conductors to said mother board is assembled at a dead end of the groove, and lands provided around through-holes which are formed in said mother board and through which electrically conductive screws are inserted, wherein said screws are tightened into said threaded holes through said through-holes so that electrical connections are established between said transmission lines and said input and output terminals of said mother board via said screws.

2. The distribution apparatus in accordance with claim 1 wherein at least three cable connecting portions are provided so that two cable connecting portions are selectable from said at least three cable connecting portions for connection to said mother board.

* * * * *